(12) United States Patent
Baker et al.

(10) Patent No.: US 11,555,564 B2
(45) Date of Patent: Jan. 17, 2023

(54) SYSTEM AND METHOD FOR AUXILIARY LINE CONNECTIONS

(71) Applicant: Baker Hughes Oilfield Operations LLC, Houston, TX (US)

(72) Inventors: Brian S. Baker, Houston, TX (US); Hunter S. Haeberle, Houston, TX (US); Kevin Sweeney, Houston, TX (US); Gregory Myers, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 339 days.

(21) Appl. No.: 16/369,354

(22) Filed: Mar. 29, 2019

(65) Prior Publication Data

US 2020/0309292 A1 Oct. 1, 2020

(51) Int. Cl.
| | | |
|---|---|---|
| *F16L 15/08* | (2006.01) | |
| *E21B 17/08* | (2006.01) | |
| *E21B 17/043* | (2006.01) | |
| *F16L 15/04* | (2006.01) | |

(52) U.S. Cl.
CPC ............ *F16L 15/08* (2013.01); *E21B 17/043* (2013.01); *E21B 17/085* (2013.01); *F16L 15/04* (2013.01)

(58) Field of Classification Search
CPC ....... F16L 19/0231; F16L 15/08; F16L 15/04; E21B 17/0853; E21B 17/085; E21B 17/01
USPC .................................. 285/387, 388
See application file for complete search history.

(56) References Cited

U.S. PATENT DOCUMENTS

| | | | | | |
|---|---|---|---|---|---|
| 944,877 | A | * | 12/1909 | Koschinski | ......... F16L 19/0231 285/388 |
| 1,016,620 | A | * | 2/1912 | Gapp | .................. F16L 19/0231 285/388 |
| 1,186,325 | A | * | 6/1916 | Metzger | ................ F16L 15/006 285/388 |
| 1,913,030 | A | * | 6/1933 | Hux | ........................ E21B 33/12 285/373 |
| 2,342,834 | A | * | 2/1944 | Brant | .................. F16L 19/0231 285/332 |

(Continued)

FOREIGN PATENT DOCUMENTS

| | | |
|---|---|---|
| WO | 2010/026373 | 3/2010 |
| WO | 2011/104629 | 9/2011 |

(Continued)

OTHER PUBLICATIONS

GE Oil & Gas, "Drilling Systems reliable to the extremes," 2009, 15 pages.

(Continued)

*Primary Examiner* — David Bochna
(74) *Attorney, Agent, or Firm* — Osha Bergman Watanabe & Burton LLP (57) ABSTRACT

A system for coupling a first pipe segment to a second pipe segment includes a pin end including a flange. The system includes a box end having a recess configured to receive the pin end, a face of the box end abutting the flange. The system includes a coupling assembly joining the first pipe segment to the second pipe segment including a split ring arranged proximate the flange and a sleeve, wherein threads of the sleeve engage first mating threads on the split ring and second mating threads on the box end.

18 Claims, 10 Drawing Sheets

(56) References Cited

U.S. PATENT DOCUMENTS

| | | | | |
|---|---|---|---|---|
| 2,443,394 | A | * | 6/1948 | Sprankl ............... F16L 27/0812 |
| | | | | 285/388 |
| 3,345,084 | A | | 10/1967 | Hanes |
| 3,692,336 | A | | 9/1972 | Zon |
| 4,043,575 | A | | 8/1977 | Roth |
| 4,209,193 | A | | 6/1980 | Ahlstone |
| 4,291,906 | A | * | 9/1981 | Donbavand ......... F16L 19/0231 |
| | | | | 285/332 |
| 4,374,595 | A | | 2/1983 | Watkins |
| 4,496,173 | A | | 1/1985 | Roche |
| 4,652,021 | A | | 3/1987 | Pido |
| 4,708,513 | A | | 11/1987 | Roche |
| 4,775,008 | A | * | 10/1988 | Cameron ............ F16L 19/0231 |
| | | | | 166/153 |
| 4,830,408 | A | | 5/1989 | Reimert |
| 4,921,284 | A | * | 5/1990 | Singeetham ........ F16L 19/0231 |
| | | | | 285/114 |
| 5,176,409 | A | * | 1/1993 | Brooks ................... F16L 17/08 |
| | | | | 285/388 |
| 5,879,030 | A | | 3/1999 | Clayson |
| 6,106,024 | A | | 8/2000 | Herman |
| 6,857,668 | B2 | | 2/2005 | Otten et al. |
| 7,231,983 | B2 | | 6/2007 | Lequang |
| 7,344,162 | B2 | | 3/2008 | Van Bilderbeek |
| 7,793,994 | B2 | * | 9/2010 | Boyd .................... F16L 19/005 |
| | | | | 285/354 |
| 8,561,706 | B2 | | 10/2013 | Averbuch et al. |
| 8,672,366 | B2 | | 3/2014 | Mogedal et al. |
| 8,733,452 | B2 | | 5/2014 | Guesnon et al. |
| 8,869,900 | B2 | | 10/2014 | Sawtell et al. |
| 9,022,125 | B2 | | 5/2015 | Weir |
| 10,012,031 | B2 | | 7/2018 | Fraczek et al. |
| 10,012,044 | B2 | * | 7/2018 | Leba ...................... E21B 17/085 |
| 10,087,687 | B2 | | 10/2018 | Gilmore et al. |
| 2003/0011195 | A1 | * | 1/2003 | Hayes, Jr. ........... F16L 19/0231 |
| | | | | 285/387 |
| 2005/0145391 | A1 | * | 7/2005 | Lequang ............... E21B 33/038 |
| | | | | 166/242.6 |
| 2008/0129045 | A1 | * | 6/2008 | Shimizu ............... F16L 19/0231 |
| | | | | 285/258 |
| 2009/0160186 | A1 | * | 6/2009 | McGuire ............. F16L 19/0231 |
| | | | | 285/354 |
| 2010/0300699 | A1 | * | 12/2010 | Papon ................... E21B 17/085 |
| | | | | 166/367 |
| 2011/0225789 | A1 | | 9/2011 | Darnell |
| 2011/0227336 | A1 | * | 9/2011 | Mogedal ............... E21B 17/085 |
| | | | | 285/314 |
| 2012/0037377 | A1 | | 2/2012 | Walker |
| 2014/0232109 | A2 | | 8/2014 | Nguyen et al. |
| 2017/0152978 | A1 | * | 6/2017 | Leeth .................. F16L 19/0231 |
| 2017/0298699 | A1 | | 10/2017 | Riggs et al. |
| 2017/0314336 | A1 | * | 11/2017 | Johnson .............. F16L 19/0231 |
| 2018/0163904 | A1 | * | 6/2018 | Nguyen .............. F16L 19/0231 |
| 2018/0252055 | A1 | | 9/2018 | Persent et al. |

FOREIGN PATENT DOCUMENTS

| | | | |
|---|---|---|---|
| WO | 2015/038000 | 3/2015 | |
| WO | WO-2017106702 A1 * | 6/2017 | ............ F16L 19/005 |

OTHER PUBLICATIONS

Dril-Quip, "Rapid-dePLOY Marine Drilling System," 2014, 16 pages.
Baker Hughes, "MR explorer Magnetic resonance logging service," 2011, 12 pages.
MHWirth, "Drilling Riser," 2017, 2 pages.
International Search Report and Written Opinion dated Jul. 1, 2020 in corresponding PCT Application No. PCT/US20/24817.

* cited by examiner

SYSTEM AND METHOD FOR AUXILIARY LINE CONNECTIONS

BACKGROUND OF THE DISCLOSURE

1. Field of the Disclosure

This disclosure relates in general to oil and gas service methodologies utilizing tools, and in particular, to systems and methods for providing threaded riser auxiliary lines.

2. Brief Description of Related Art

In oil and gas production, drilling and recovery may be conducted at sea, which may include platforms or rigs having risers to adjust a position of the platform in response to movement of the ocean. The risers may provide an upward force on the platform to enable the platform to raise and lower along with the sea, thereby reducing the likelihood of causing excess strain and movement to components of the drilling system. In various embodiments, the riser tensioners may include hydraulic cylinders that receive a high pressure fluid to apply the force to the platform. Furthermore, the risers may include auxiliary lines to transport various fluids to different portions of the drilling operation. For example, hydraulic fluid may be transmitted to subsea components, such as a blowout preventer (BOP). In operation, the auxiliary lines may include box and pin connectors to couple the pressure containing portions of the line together. In the event the connection is damaged, the riser is generally taken offline and sent to shore for repairs. This causes undesirable delays and is costly to producers.

SUMMARY OF THE DISCLOSURE

Applicants recognized the problems noted above herein and conceived and developed embodiments of systems and methods, according to the present disclosure, for coupling auxiliary lines.

In an embodiment, a system for coupling a first pipe segment to a second pipe segment includes a pin end of the first pipe segment, the pin end including a flange. The system also includes a box end of the second pipe segment, the box end having a recess configured to receive the pin end, a face of the box end abutting the flange when the pin end is installed within the recess. The system further includes a coupling assembly joining the first pipe segment to the second pipe segment, the coupling assembly includes a split ring arranged proximate the flange and a sleeve, wherein threads of the sleeve engage first mating threads on the split ring and second mating threads on the box end to secure the first pipe segment to the second pipe segment.

In another embodiment a coupling assembly for joining a first tubular segment to a second tubular segment includes a split ring adapted to couple to the first tubular segment, the split ring including a threaded portion at a first outer diameter and an end having a second outer diameter, larger than the first outer diameter. The coupling assembly also includes a sleeve adapted to couple to the second tubular segment and the split ring, wherein the sleeve includes internal threads configured to couple to mating threads on the second tubular segment and to the threaded portion of the split ring.

In an embodiment, a method for coupling a first pipe segment to a second pipe segment includes coupling a pin to the first pipe segment, the pin including a flange. The method also includes installing at least a portion of a coupling assembly to the first pipe segment, the coupling assembly arranged proximate the flange to axially restrict movement of at least a portion of the coupling assembly in at least one direction. The method further includes coupling a box to the second pipe segment. The method also includes engaging external threads of the box via internal threads of at least a portion of the coupling assembly. The method includes coupling the box to the pin via rotation of at least a portion of the coupling assembly.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE PREFERRED EMBODIMENT

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure include a coupling assembly for joining tubular sections together by reducing a number of components that include threads, which may be subject to environmental conditions that may cause corrosion or seizing. In various embodiments, adjacent pin stabs are coupled together via the coupling assembly where one of the pin stabs (the pin end) does not include threads while the other pin stab (the box end) does include threads. A split ring may be coupled to the pin end and a threaded sleeve may engage threads on both the split ring and the box end to couple the adjacent pin stabs. In various embodiments, components may be formed from different materials, for example materials having different strength properties. For example, components that are not exposed to fluid may be formed from non-NACE materials having improved strength factors, which may enable smaller components. Furthermore, installation may be improved by maintaining dimensions small enough to extend through associated flanges of marine risers and also enable torqueing tools without interfering with other equipment.

In various embodiments of the present disclosure, threading may be removed from a permanent pin component, which may desensitize the component from potential corrosion issues. In other words, threaded fittings may be arranged on components that are expected to be removed (or replaced). The system may introduce flexibility via the introduction of a split ring and sleeve arrangement that may enable replacement of the auxiliary line without removal of ancillary riser components such as buoyancy, clamp bands, and centralizers, for example, in embodiments where the system is utilized with auxiliary lines for marine risers. However, it should be appreciated that embodiments of the present disclosure may be used with a variety of piping systems where coupling one or more segments together may be desirable. In various embodiments, components forming the present disclosure may be sized to enable torqueing tools onto the threaded components, thereby facilitating joining and releasing of the components. The inclusion of sizing to facilitate torqueing tools may enable breaking bonds formed when, for example, threads are rusted together. Furthermore, in various embodiments, certain components may be arranged to be cut (e.g., mechanical cutting, torch cutting, etc.) or otherwise decoupled from the permanent pin connection. As a result, if torqueing tools are unsuccessful in decoupling components, certain components may be removed in other ways, while leaving the permanent pin component in place. In various embodiments, components of the present disclosure are arranged in such a way that the highly stressed areas inhabit non-NACE components, which are not held to low-hardness (low-strength) requirements of NACE. As would be appreciated, NACE components refer to standards or criteria established by the NACE International. These standards are directed toward material properties, surface preparation techniques, coatings, and the like to reduce the likelihood of corrosion of materials in a variety of applications. NACE standards may provide recommendations for certain percentages of elements within alloy steels and the like that reduce the likelihood of corrosion or other material damage. For example, NACE MR0175/ISO 15156 gives requirements and recommendations for the selection and qualification of carbon and low-alloy steels, corrosion-resistant alloys, and other alloys for service in equipment used in oil and natural gas production and natural gas treatment plants in H2S-containing environments, whose failure could pose a risk to the health and safety of the public and personnel or to the equipment itself. However, inclusion of other elements may impact certain properties, such as material strength, which may decrease load ratings. Accordingly, components may be efficiently sized by using stronger materials at certain locations. This may reduce costs, reduce the size of the components, increase safety factors, and also be easier to source. It should be appreciated that, while embodiments of the present disclosure may refer to NACE or non-NACE components, that such components are not limited to these particular standards. Rather, referring to NACE and non-NACE components refers to materials having different degrees of corrosion resistance and/or different strength values.

Figure 1:
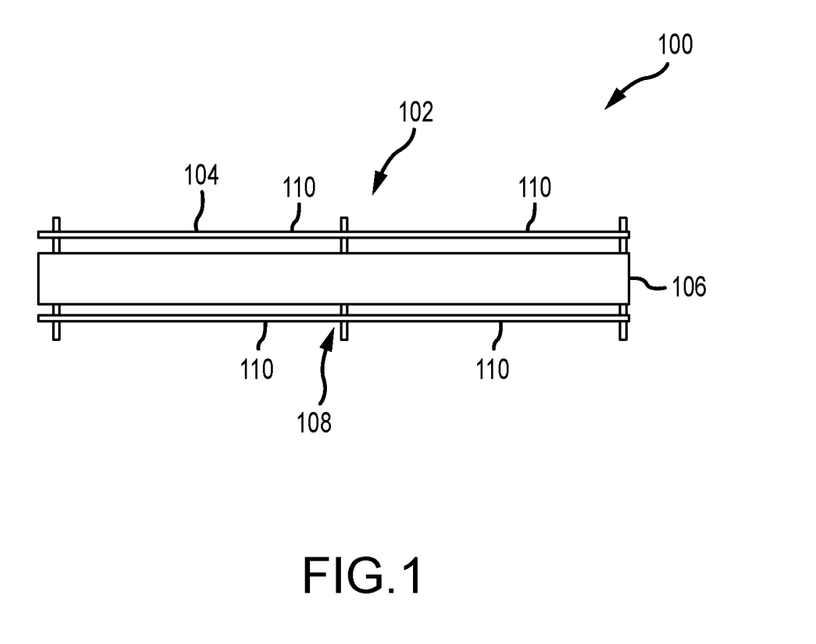
FIG. 1 is a schematic side view of an embodiment of a riser joint, in accordance with embodiments of the present disclosure.

FIG. 1 is a schematic side view of an embodiment of a segment 100 of a riser joint 102 that includes auxiliary lines 104 arranged radially outward from a main line 106 of the riser joint 102 and that are substantially parallel to the main line 106. The riser joint 102 may also be referred to as a Marine Drilling Riser and may formed at various lengths, such as between approximately 5 feet and 90 feet, or even longer. The auxiliary lines 104 may be clamped along the sides of the main line 106 for transmitting drilling fluids and hydraulic fluids as needed for various components, such as blowout preventer (BOP) control. In various embodiments, there may be up to six auxiliary lines 104 coupled to the main line 106. For example, individual lines may be for choke, for kill, for boost, for hydraulic controls, and for more specialized functions. In various embodiments, the auxiliary lines 104 include a pin end and a box end 108 to facilitate coupling between different sections 110 of the auxiliary lines 104. For example, the auxiliary lines 104 may be long and the lines may be broken into the sections 110 in order to enable repairs to certain sections 110 without working on the entire length of the auxiliary line 104. As used herein, line may refer to a tubular or pipe-like connection to facilitate transmission of a liquid, gas, solid, or a combination thereof (which may be referred to herein as a "fluid") under pressure.

In operation, the pin end is inserted into a corresponding box end to form a pressure-containing connection between different sections 110 of the auxiliary line 104. In various embodiments, the sections 110 may be welded together, for example at an interface between the pin and box ends. This welded connection may enable high-pressure transmission of fluids through the auxiliary lines. In various embodiments, the pressures within the lines may be approximately 20,000 pounds per square inch (psi), however it should be appreciated that the pressure may be greater than or less than 20,000 psi. Accordingly, robust connections are utilized in order to reduce the likelihood of leaks. Additionally, external loads are transmitted through the auxiliary lines to efficiently distribute the tensile forces and bending moments through the riser system. Connections are designed to be sturdy enough to account for these load combinations while continuing to maintain pressure integrity.

Sections 110 of the auxiliary line 104 may become damaged or otherwise unusable during operations, such as due to contact from outside forces, normal wear and tear, and the like. When the auxiliary lines 104 are damaged, the riser 102 is taken out of service and sent to shore for repairs because the sections 110 may be welded together. This process presents logistical challenges and costly operational delays. Systems and methods of the present disclosure provide a non-welded connection between sections 110 of the auxiliary lines 104, thereby enabling repairs on the platform. That is, repairs without sending the riser 102 back to shore. As such, the logistical challenges may be substantially eliminated and the time and cost associated with the repairs or replacement may be reduced.

Figure 2:
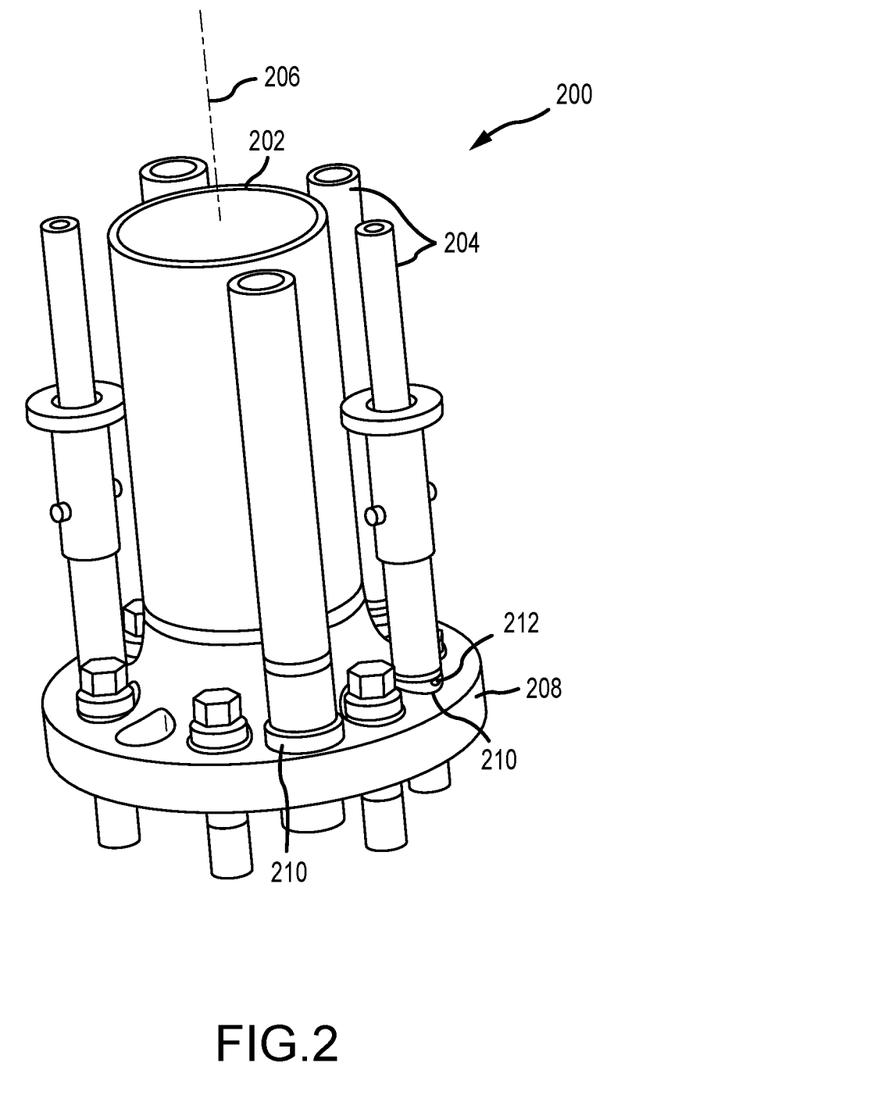
FIG. 2 is a perspective view of an embodiment of a riser joint, in accordance with embodiments of the present disclosure.

FIG. 2 is an isometric view of an embodiment of a riser segment 200 that includes a main line 202 and a plurality of auxiliary lines 204. It should be appreciated that the five auxiliary lines 204 are for illustrative purposes only and that, in various embodiments, more or fewer auxiliary lines 204 may be included. The auxiliary lines 204 are arranged radially outward from the main line 202 with respect to an axis 206 and positioned circumferentially about a circumference of the main line 202. A flange 208 is coupled to the main line 202 and includes apertures 210 for receiving the auxiliary line 204. In various embodiments, the flange 208 may include additional couplings and/or fixtures 212 to facilitate securing the auxiliary line 204 to the flange 208. It should be appreciated that the auxiliary line 204 may have different diameters and include additional components, such as thrust columns, which will be described herein.

Figure 3A:
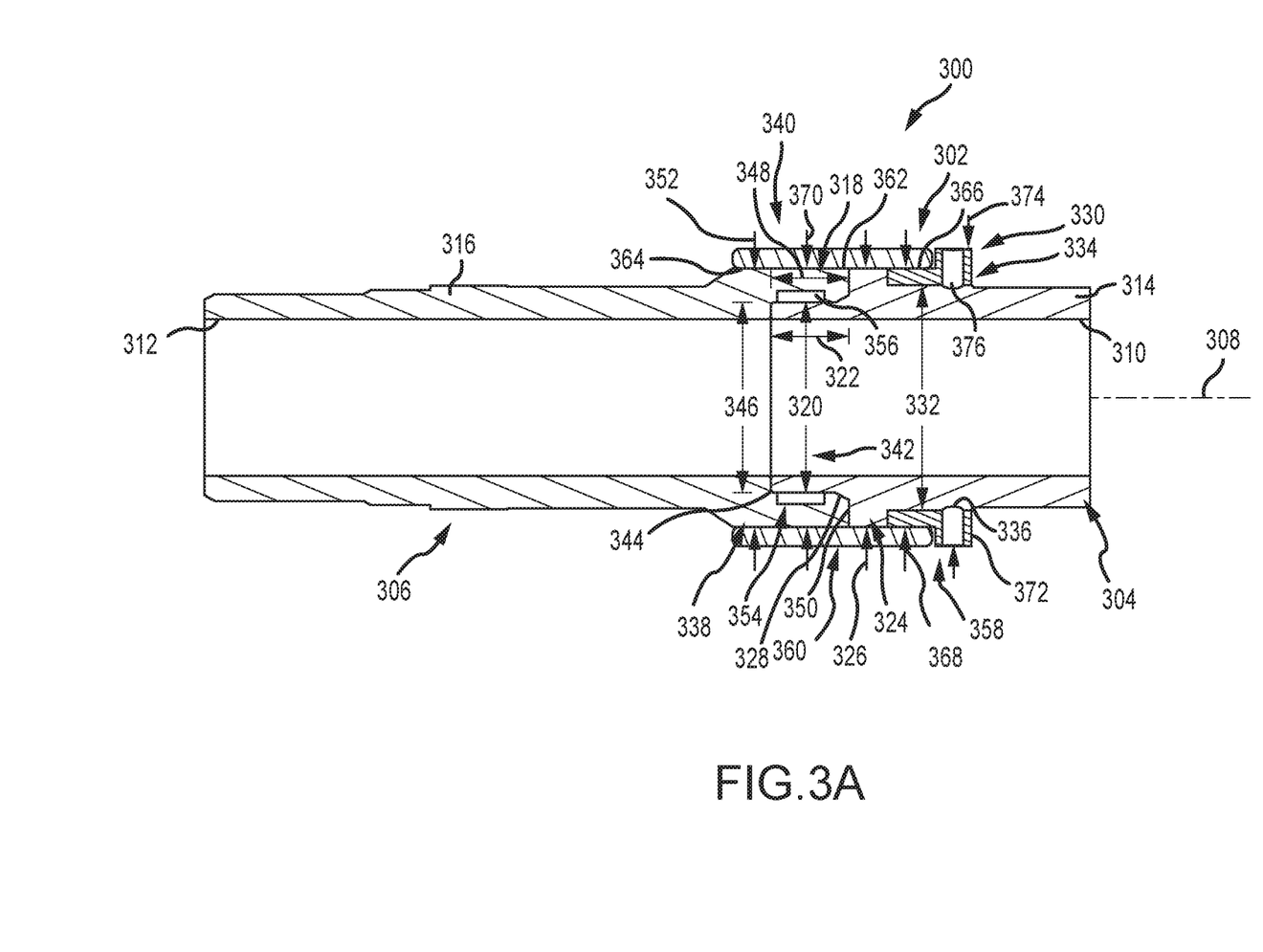
FIG. 3A is a schematic cross-sectional view of an embodiment of an auxiliary joint assembly, in accordance with embodiments of the present disclosure.

FIG. 3A is a schematic cross-sectional side view of an embodiment of a joint 300 including a coupling assembly 302 to join a first segment 304 to a second segment 306. It should be appreciated that the respective segments 304, 306 may be referred to as pins, such as "permanent pin" or "replaceable pin." Additionally, in embodiments, the ends of the respective segments 304, 306 may be referred to as having a pin end or a box end. When referring to a pin end and box end coupling, it should be appreciated that the pin end refers to the male portion and the box end refers to the female portion.

In various embodiments, the first segment 304 and the second segment 306 are axially aligned along an axis 308 such that respective bores 310, 312 of the first segment 304 and the second segment 306 are aligned. It should be appreciated that, while the illustrated bores 310, 312 have the same diameter in the illustrated embodiment, in other embodiments the diameters may not be equal. Each of the respective segment 304, 306 includes body portions 314, 316 that extend axially along the axis 308 to form a tubular to enable fluid to pass through the bores 310, 312. As will be described in detail below, various different sections of the segments 304, 306 may be particularly selected and sized based on one or more properties of the fluid extending through the segments 304, 306, operating conditions, environmental conditions, or the like.

The illustrated first segment 304 is the above-referenced permanent pin, in that the permanent pin may be designed to couple to the marine riser, such as the flange 208 (FIG. 2) and be seen as a permanent or semi-permanent fixture. When utilizing permanent herein, the permanent pin may refer to a pin that has a longer expected life than, for example, a joining replacement pin. In other words, between a permanent pin and a replacement pin, the replacement pin is preferentially removed during replacement or repair operations.

The first segment 304 includes a pin end 318 having a first diameter 320 that extends for a first axial length 322. It should be appreciated that the first axial distance 322 may be particularly selected based on operating conditions and the like. For example, in various embodiments, the first axial length 322 may be a ratio or percentage of, for example, a length of the first segment 304. However, in other embodiments, the first axial length 322 may be selected based on other design conditions, such as segment diameter, anticipated operating conditions, and the like.

Arranged axially proximate the pin end 318 is a flange 324. In various embodiments, the flange 324 may also be referred to as a shoulder or stop. In operation, the flange 324 may receive at least a portion of the tensile load applied to the first segment 304. The flange 324 has a second diameter 326 that is larger than the first diameter 320. While the illustrated embodiment includes a transition 328 between the pin end 318 and the flange 324, in the form of a sloped surface, it should be appreciated that the transition 328 may be any shape, such as 90 degree bend or the like. The transition 328 may be utilized to gradually accommodate the difference in diameters between the first diameter 320 and the second diameter 326.

Continuing with the first segment 304, an axial section 330 having a third diameter 332 is arranged opposite the flange 324. In the illustrated embodiment, the third diameter 332 is smaller than the second diameter 326 and also larger than the first diameter 320. However, it should be appreciated that, in other embodiments, the third diameter 332 may be substantially equal to the second diameter 326. In various embodiments, the axial section 330 may extend along a majority of a length of the first segment 304 such that the axial section 330 maintains a substantially diameter along a majority of the length of the first segment 304. However in other embodiments, various other step downs or the like may be arranged along the length of the first segment 304, as particularly selected, to determine an outside diameter.

In various embodiments, the axial section 330 includes a retainer 334. The retainer may be utilized to hold or otherwise secure a split ring or collar to an outsider diameter of the first segment 304 at a predetermined location. For example, in the illustrated embodiment, the retainer 334 includes a groove 336. In certain embodiments, the split ring or collar may include a feature that extends, at least partially, into the groove 336 and may block or otherwise limit axial movement of the split ring or collar. For example, in certain embodiments, a set screw or the like may extend from an outside diameter of the split ring or collar into the groove 336 such that axial movement is blocked.

The illustrated joint 300 forms an interface 338 between the first segment 304 and the second segment 306 such that there may be at least one contact point between the first segment 304 and the second segment 306. The interface 338 may be formed at a box end 340 of the second segment 306 that includes a recess 342 that receives the pin end 318 of the first segment 304. In the illustrated embodiment, the recess 342 includes box walls 344 at a fourth diameter 346. The fourth diameter 346 may be particularly selected based on the first diameter 320 to facilitate coupling between the first segment 304 and the second segment 306. In the illustrated embodiment, the box 340 extends a second axial length 348 that is substantially equal to the first axial length 322, thereby receiving the pin 318. As illustrated, the box 340 further includes a face 350 that contacts the flange 324 when the pin 318 is installed within the recess 342. The face 350 is positioned on an axial surface of the box 340 at a fifth diameter 352, which is substantially equal to the second diameter 326. However it should be appreciated that, in other embodiments, the fifth diameter 352 may be larger than or smaller than the second diameter 326. However, as will be described below, it may be advantageous for the fifth diameter 352 to be substantially equal to the second diameter 326 so that a threaded sleeve may be utilized engage threads along the second diameter 326 to couple the second segment 306 to a collar arranged on the first segment 304.

In the illustrated embodiment, the box wall 344 includes an annular recess 354, which receives a seal 356. The seal 356 may be compressed when the first segment 304 is coupled to the second segment 306, thereby blocking fluid from flowing out of the bores 310, 312. While the seal 356 and the recess 354 are illustrated on the box 340 in the illustrated embodiment, it should be appreciated that the recess 354 and the seal 356 may be arranged on the pin end 318 in other embodiments. Furthermore, the shape of the annular recess 354 is for illustrative purposes and it should be appreciated that, in various embodiments, the annular recess 354 may be shaped to accommodate one or more seals 356 having a variety of geometries.

The illustrated embodiment includes the coupling assembly 302 for joining the first segment 304 to the second segment 306. The illustrated coupling assembly 302 includes a split ring 358 and a sleeve 360. In various embodiments, the sleeve 360 includes threads 362 extending along at least a portion thereof. The threads 362 engage threads 364 arranged on the second segment 306 (e.g., at the fifth diameter 352) and also threads 366 arranged on the split ring 358. Accordingly, the first segment 304 may be secured to the second segment 306 via the sleeve 360.

In the illustrated embodiment, the split ring 358 includes the threads 366 at a sixth diameter 368, which is substantially equal to the second diameter 326. As a result, the sleeve 360 may have a substantially constant seventh diameter 370 to facilitate coupling the first segment 304 to the second segment 306. Further illustrated on the split ring 358 is an end 372 having an eighth diameter 374 larger than the sixth diameter 368 in the illustrated embodiment. The end 372 may be utilized as a stop to prevent the sleeve 360 from extending too far axially and exposing the threads 364 on the second segment 306. In other words, the end 372 may block further movement of the sleeve 360 in at least one axial direction. In operation, the end 372 may be vertically lower than the sleeve 360, and as a result, gravity may assist with bringing the sleeve 360 toward and resting on the end 372. In other embodiments, however, the end 372 may be vertically higher than the sleeve 360.

As described above, in various embodiments the end 372 includes one or more apertures 376 to facilitate coupling the split ring 358 to the first segment 304. For example, set screws or pins may extend through the apertures 376 and into the groove 336 to secure the split ring 358 to the first segment 304. Moreover, in various embodiments, the split ring 358 may include one or more fasteners to secure the split ring 358 to the first segment 304 without the use of additional coupling devices. Furthermore, in embodiments, one or more anti-rotation elements may be utilized to join the sleeve 360 and the split ring 358 directly together. For example, a pin may extend through the sleeve 360 and mate with a corresponding orifice of the split ring 358.

As will be described herein, in operation an outer diameter of the coupling assembly 302 may be less than a diameter of one or more apertures in the flange (208) to enable installation of the coupling assembly 302 through the flange. Furthermore, in various embodiments, the fifth diameter 352 may be less than a diameter of the one or more apertures in the flange (208) to enable installation. For example, the first segment 304 may be arranged in a spaced relationship (e.g., axially above) the aperture while the second segment 306 is installed into position through the aperture.

In various embodiments, different components of the joint 300 may be formed from different materials based on operating conditions. For example, in embodiments, the components of the coupling assembly 302, such as the split ring 358 and the sleeve 360 may be formed from stronger, harder materials because these components are not subject to the same piping standards as the first segment 304 and the second segment 306. In other words, the split ring 358 and the sleeve 360 may be formed from non-NACE materials, thereby enabling stronger, harder materials such that the dimensions may be smaller than if NACE limited materials were used. Accordingly, the coupling assembly 302 may be both smaller and more robust.

Figure 3B:
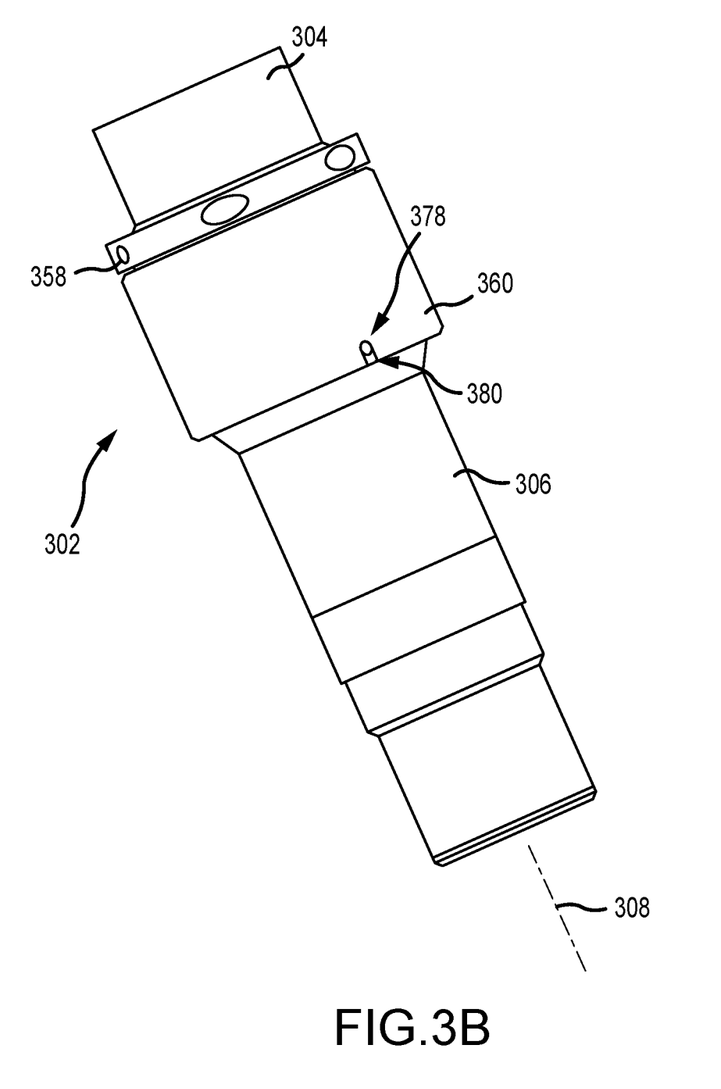
FIG. 3B is a perspective view of an embodiment of an auxiliary joint assembly, in accordance with embodiments of the present disclosure.

FIG. 3B is a perspective view of an embodiment of the coupling assembly 302 joining the first segment 304 to the second segment 306. In the illustrated embodiment, the sleeve 360 is coupled to the split ring 358, thereby securing the first segment 304 to the second segment. The illustrated sleeve 360 includes a slot 378 that received a pin and/or set screw 380 of the second segment 306. In various embodiments, the pin 380 is rigidly coupled to the second segment 306 to block rotation of the sleeve 360 about the axis 308 when the pin 380 is positioned within the slot 378. Accordingly, inadvertent decoupling of the sleeve 360, for example due to vibration or external forces, may be avoided.

Figure 4:
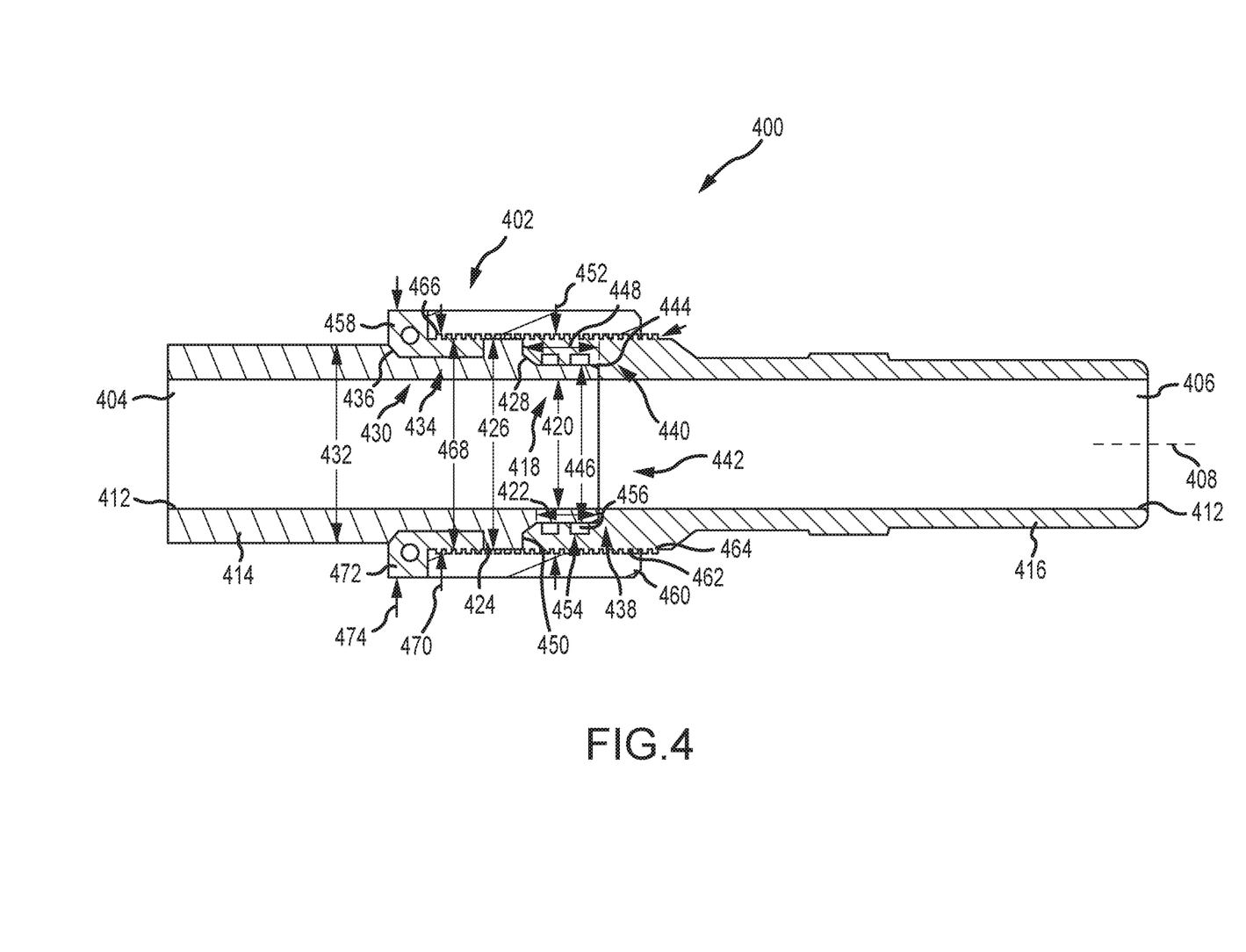
FIG. 4 is a schematic cross-sectional view of an embodiment of an auxiliary joint assembly, in accordance with embodiments of the present disclosure.

FIG. 4 is a cross-sectional side elevation view of an embodiment of a joint 400 including a coupling assembly 402. As described above, the segments 404, 406 may be referred to as pins, such as "permanent pin" or "replaceable pin." Additionally, in embodiments, the ends of the respective segments 404, 406 may be referred to as having a pin end or a box end.

In various embodiments, the first segment 404 and the second segment 406 are axially aligned along an axis 408 such that respective bores 410, 412 of the first segment 404 and the second segment 406 are aligned. It should be appreciated that, while the illustrated bores 410, 412 have the same diameter in the illustrated embodiment, in other embodiments the diameters may not be equal, as described above with respect to the embodiment illustrated in FIG. 3. Each of the respective segment 404, 406 include body portions 414, 416 that extend axially along the axis 408 to form a tubular to enable fluid to pass through the bores 410, 412. As described above, various different sections of the segments 404, 406 may be particularly selected and sized based on one or more properties of the fluid extending through the segments 404, 406, operating conditions, environmental conditions, or the like.

The illustrated first segment 404 is the above-referenced permanent pin, in that the permanent pin may be designed to couple to the marine riser, as described above, the permanent pin is not intended to be a reference a permanent component that cannot be removed, but rather, a component that is intended to be replaced less often than the replacement pin.

The first segment 404 includes a pin end 418 having a first diameter 420 that extends for a first axial length 422. It should be appreciated that the first axial distance 422 may be particularly selected based on operating conditions and the like. Arranged axially proximate the pin end 418 is a flange 424. In various embodiments, the flange 424 may also be referred to as a shoulder or stop. In operation, the flange 424 may receive at least a portion of the tensile load applied to the first segment 404. The flange 424 has a second diameter 426 that is larger than the first diameter 420. While the illustrated embodiment includes a transition 428 between the pin end 418 and the flange 424, in the form of a sloped surface, it should be appreciated that the transition 428 may be any shape, such as 90 degree bend or the like, as described above.

The first segment 404 also includes an axial section 430 having a third diameter 432 arranged opposite the flange 424. In the illustrated embodiment, the third diameter 432 is smaller than the second diameter 426 and also larger than the first diameter 420. However, it should be appreciated that, in other embodiments, the third diameter 432 may be substantially equal to the second diameter 426.

In various embodiments, the axial section 430 includes a recess 434 having a shoulder 436. The recess 434 may be utilized to receive a split ring or collar to facilitate coupling the first segment 404 to the second segment 406, as will be described below. The shoulder 436 may block axial movement of the split ring or collar along the axis 408.

The illustrated joint 400 forms an interface 438 between the first segment 404 and the second segment 406 such that there may be at least one contact point between the first segment 404 and the second segment 406. The interface 438 may be formed at a box end 440 of the second segment 406 that includes a recess 442 that receives the pin end 418 of the first segment 404. In the illustrated embodiment, the recess 442 includes box walls 444 at a fourth diameter 446. The fourth diameter 446 may be particularly selected based on the first diameter 420 to facilitate coupling between the first segment 404 and the second segment 406. In the illustrated embodiment, the box 440 extends a second axial length 448 that is substantially equal to the first axial length 422, thereby receiving the pin 418. As illustrated, the box 440 further includes a face 450 that contacts the flange 424 when the pin 418 is installed within the recess 442. The face 450 is positioned on an axial surface of the box 440 at a fifth diameter 452, which is substantially equal to the second diameter 426. However it should be appreciated that, in other embodiments, the fifth diameter 452 may be larger than or smaller than the second diameter 426. However, as will be described below, it may be advantageous for the fifth diameter 452 to be substantially equal to the second diameter 426 so that a threaded sleeve may be utilized engage threads along the fifth diameter 452 to couple the second segment 406 to a collar arranged on the first segment 404.

In the illustrated embodiment, the box wall 444 includes an annular recess 454, which receives a seal 456. The seal 456 may be compressed when the first segment 404 is coupled to the second segment 406, thereby blocking fluid from flowing out of the bores 410, 412. While the seal 456 and the recess 454 are illustrated on the box 440 in the illustrated embodiment, it should be appreciated that the recess 454 and the seal 456 may be arranged on the pin end 418 in other embodiments. As described above, in various embodiments, the recess 454 may have a variety of different geometric arrangements to accommodate one or more seals 456 having different geometries.

The illustrated embodiment includes the coupling assembly 402 for joining the first segment 404 to the second segment 406. The illustrated coupling assembly 402 includes a split ring 458 and a sleeve 460. In various embodiments, the sleeve 460 includes threads 462 extending along at least a portion thereof. The threads 462 engage threads 464 arranged on the second segment 406 (e.g., at the fifth diameter 452) and also threads 466 arranged on the split ring 458. Accordingly, the first segment 404 may be secured to the second segment 406 via the sleeve 460.

In the illustrated embodiment, the split ring 458 includes the threads 466 at a sixth diameter 468, which is substantially equal to the second diameter 426. As a result, the sleeve 460 may have a substantially constant seventh diameter 470 to facilitate coupling the first segment 404 to the second segment 406. Further illustrated on the split ring 458 is an end 472 having an eighth diameter 474 larger than the sixth diameter 468 in the illustrated embodiment. The end 472 may be utilized as a stop to prevent the sleeve 460 from extending too far axially along the first segment 404. In other words, the end 472 may block further movement of the sleeve 460 in at least one axial direction. However, in various embodiments, a length of the sleeve 460 may be particularly selected to expose or fully cover the threads 464. In operation, the end 472 may be vertically lower than the sleeve 460, and as a result, gravity may assist with bringing the sleeve 460 toward and resting on the end 472. In other embodiments, however, the end 472 may be vertically higher than the sleeve 460.

As described above, in various embodiments the end 472 includes one or more apertures 476 to facilitate coupling the split ring 458 to the first segment 404. For example, fasteners may extend through the illustrated apertures 476 to secure the split components of the split ring 458 together. As described above, in certain embodiments, additional fasteners may be utilized to further couple the split ring 458 to the first segment 404, such as a set screw or the like.

As described above, in operation an outer diameter of the coupling assembly 402 may be less than a diameter of one or more apertures in the flange (FIG. 2) to enable installation of the coupling assembly 402 through the flange. Furthermore, in various embodiments, the fifth diameter 452 may be less than a diameter of the one or more apertures in the flange (FIG. 2) to enable installation. For example, the first segment 404 may be arranged in a spaced relationship (e.g., axially above) the aperture while the second segment 406 is installed into position through the aperture.

Figure 5:
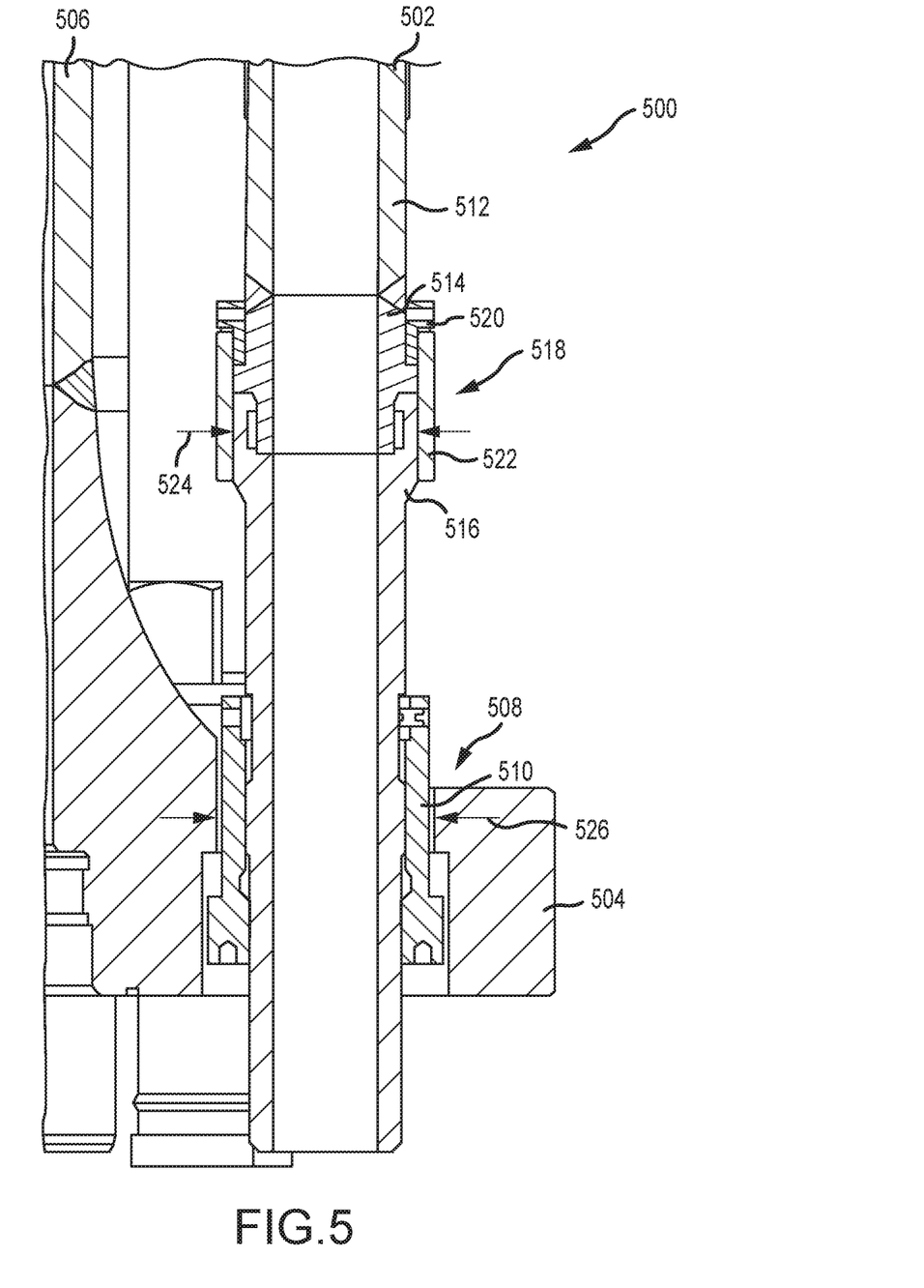
FIG. 5 is a schematic cross-sectional view of an embodiment of an auxiliary line configuration, in accordance with embodiments of the present disclosure.

FIG. 5 is a cross-sectional view of an embodiment of a riser segment 500 including an auxiliary line 502 coupled to a flange 504 extending from a main line 506. In the illustrated embodiment, the auxiliary line 502 extends through an aperture 508 of the flange 504 and includes a lock nut 510 that secures the auxiliary line 502 to the flange 504. In the illustrated embodiment, a pipe segment 512 is coupled to a pin 514. For example, the pin 514 may be welded to an end of the pipe segment 512, as shown in the illustrated embodiment. It should be appreciated that such a connection may be formed prior to installation of the auxiliary line 502, for example, at the shore, thereby reducing the likelihood of a welding operation on the offshore platform.

The illustrated pin 512 is coupled to a box 516 via a coupling assembly 518, as described above with respect to FIGS. 3 and 4. The coupling assembly 518 includes the above-described split ring 520 and sleeve 522. The illustrated embodiment includes the coupling assembly described in FIG. 3, however, it should be appreciated that the coupling assembly described in FIG. 4, as well as other configurations described herein, may also be utilized in the arrangement illustrated in FIG. 5.

As described above, the box 516 includes an outer diameter 524, which is smaller than an aperture diameter 526. As a result, the box 516 may be installed by passing through the aperture 508, thereby reducing work to install the box 516. For example, the split ring 520 may be installed on the pin 514 and the sleeve 522 may be arranged in position axially higher than the flange 504. Thereafter, the box 516 may pass through the aperture 508 and engage the sleeve 522 (e.g., via the mating threads described above). In certain embodiments, other dimensions of the auxiliary line 502 and related components may be particularly selected based on the dimensions of other components of the flange 504. For example, the outer diameter 524 may be selected based, at least in part, on the aperture diameter 526 and other dimensions may be based on tooling or other considerations.

It should be appreciated that the embodiment illustrated in FIG. 5 has been simplified for discussion purposes and that other components have been eliminated for clarity with this discussion. For example, various fasteners, thrust columns, and the like have been omitted.

Figure 6A:
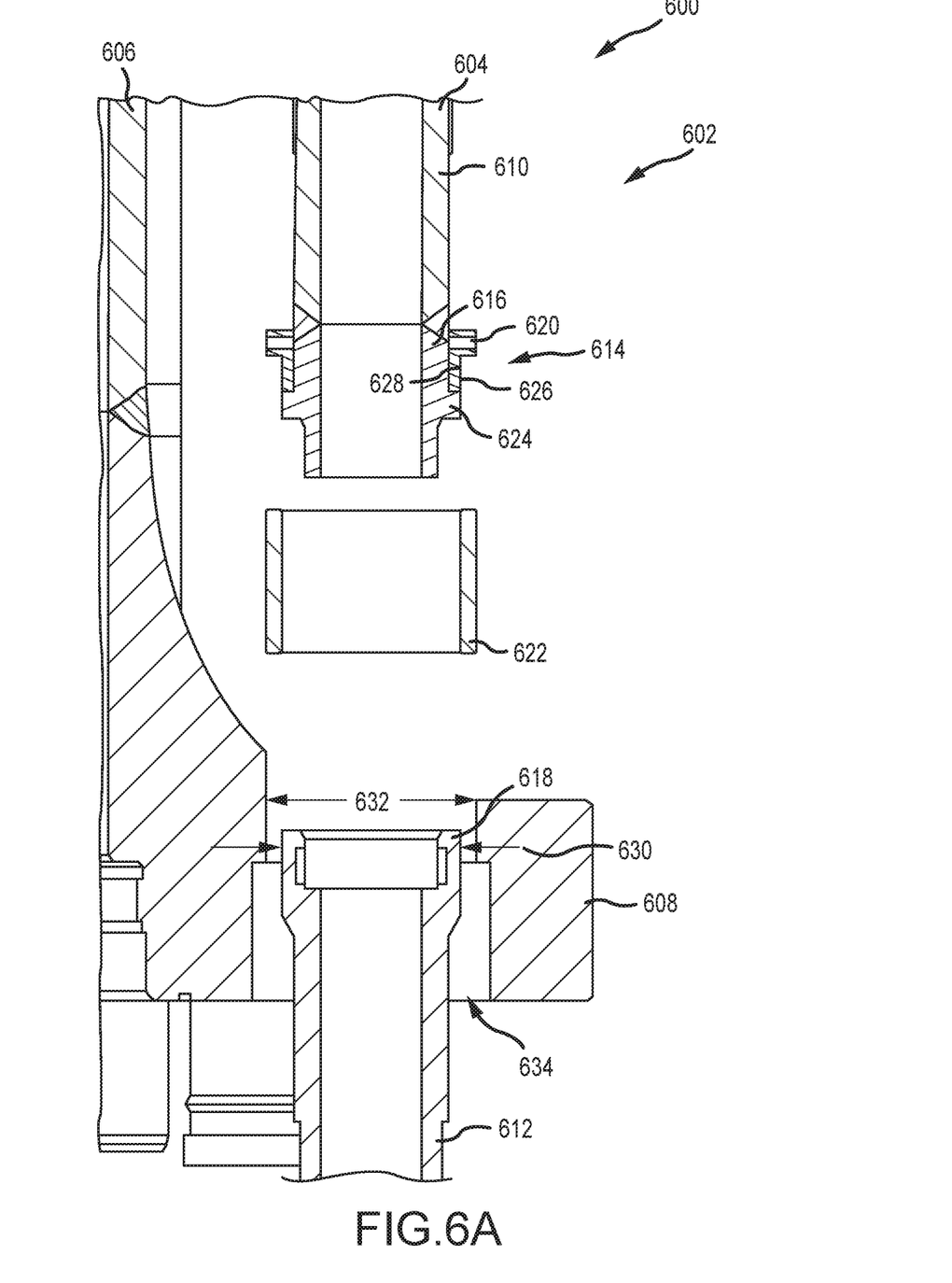
FIG. 6A is a schematic cross-sectional view of an embodiment of an installation scenario, in accordance with embodiments of the present disclosure.
Figure 6B:
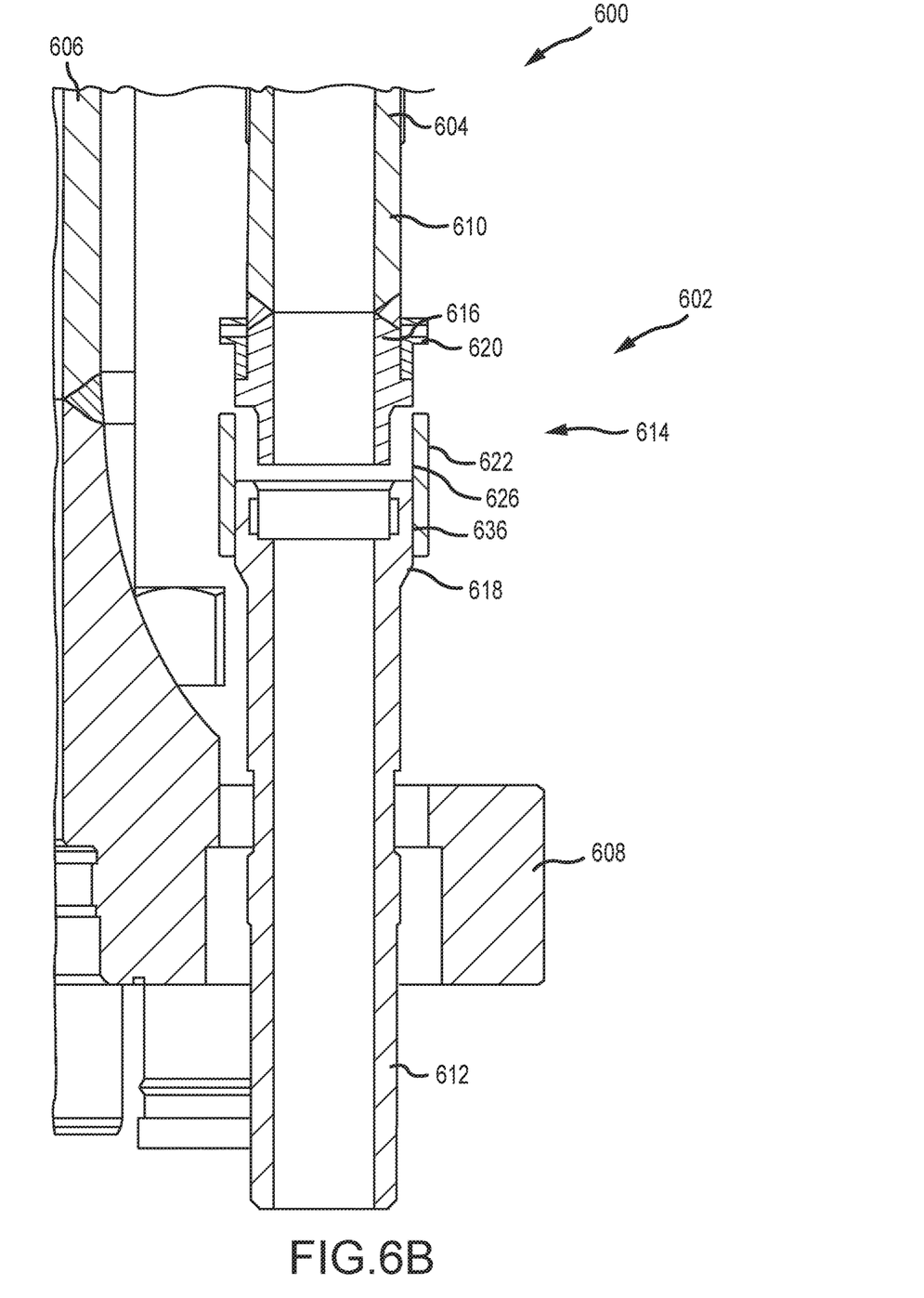
FIG. 6B is a schematic cross-sectional view of an embodiment of an installation scenario, in accordance with embodiments of the present disclosure.

FIGS. 6A and 6B are cross-sectional views of an embodiment of an installation scenario 600 where embodiments of the present disclosure may be installed on a riser segment 602. It should be appreciated that the installation procedure utilized may be done as a retrofit application (e.g., an existing line is modified to include, for example, a pin) and/or as new installation.

In FIG. 6A, the riser segment 602 includes an auxiliary line 604 and a main line 606 having a flange 608 extending radially outward. In the illustrated embodiment, the auxiliary line 604 includes a first segment 610 and a second segment 612 that will be joined together via a coupling assembly 614. The illustrated first segment 610 includes a pin 616, which as described above, may be described as a permanent pin. The second segment 612 includes a box end 618, which as described above, may also be described as a replaceable pin.

In the illustrated embodiment, the coupling assembly 614 includes a split ring 620 and a sleeve 622. The illustrated split ring 620 is coupled to the pin 616 and a flange 624 of the pin 616 blocks axial movement of the split ring 620 in at least one direction (e.g., a downward direction relative to the page). In the illustrated embodiment, the sleeve 622 is arranged between the first segment 610 and the second segment 612. As will be described below, the sleeve 622 may be coupled to the second segment 612 prior to coupling the first segment 610 to the second segment 612. This installation procedure may prevent rotation of the seals arranged within the box end of the second segment 612 (FIGS. 3A and 4) from rotating over the seal surface, and rather, enables the seals to be pulled straight over the pin 616 of the first segment 610. As described above, in various embodiments, threads 626 of the sleeve 622 may engage threads 628 of the split ring 620 to couple the first segment 610 to the second segment 612.

As shown, an outer diameter 630 of the box 618 is less than a diameter 632 of an aperture 634 of the flange 624. As a result, the box 618 may pass up through the aperture 634 for installation and connection to the pin 616. In this manner, the box end 618 may be installed and/or removed without cutting or otherwise taking parts out of service. For example, in embodiments where the initial installation is made via the illustrated box and pin connector, the box end 618 may be decoupled from the pin 616 and then removed in the same manner. As a result, down time for maintenance on the auxiliary line 604 may be reduced.

FIG. 6B illustrates the box end 618 engaging the illustrated sleeve 622. In various embodiments, threads 636 engage the threads 626 of the sleeve 622 to facilitate coupling the pin 616 to the box end 618. In embodiments, the sleeve 622 may be secured to the box end 618 after the sleeve 612 is coupled to the box end 618. For example, while not illustrated in FIG. 6B, anti-rotation features, such as the feature illustrated in FIG. 3B, may be utilized. As a result, the sleeve 622 may be threaded into place on the box end 618 and then secured via a screw, pin, or other anti-rotation feature. In various embodiments, one or more dimensions may enable tools, such as torqueing tools, to facilitate forming the connection between the box end 618 and the pin 616. For example, rotation of the split ring 620 may enable coupling between the box end 618 and the pin 616 via rotation about the first segment 610. In certain embodiments, the second segment 612 and/or the sleeve 622 may rotate during installation, for example, in response to a torque applied to the sleeve 622. Accordingly, the first segment 610 may be joined to the second segment 612 via the coupling assembly 614. As described above, an installation where the split ring 620 rotates may reduce the likelihood of the seals (FIGS. 3A and 4) rotating during installation. Thereafter, if disassembly is necessary, the threaded connection may be broken, one or more components may be cut, or the like.

Figure 7:
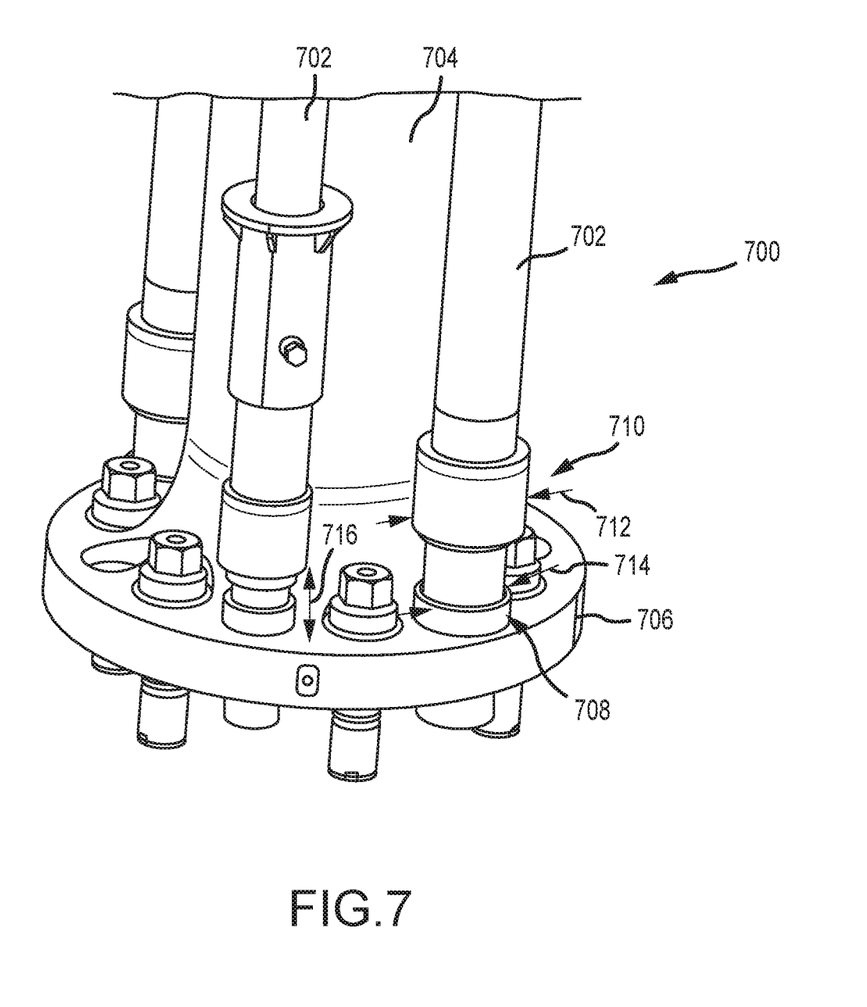
FIG. 7 is a perspective view of an embodiment of a riser joint, in accordance with embodiments of the present disclosure.

FIG. 7 is a perspective view of an embodiment of a riser segment 700 including auxiliary lines 702 and a main line 704. In the illustrated embodiment, a flange 706 is coupled to the main line 704 and the auxiliary lines 702 extend through respective apertures 708 forming in the flange 706. In the illustrated embodiment, a coupling assembly 710 joins auxiliary line segments together. In the illustrated embodiment, an outer diameter 712 of the coupling assembly 710 is larger than a diameter 714 of the apertures 708. Accordingly, axial movement may be blocked in at least one direction. However, as illustrated, other segments may have diameters less than the apertures 708, as described above, to facilitate installation of various components. Furthermore, as illustrated, one or more components of the coupling assembly 710 may be arranged at a higher elevation 716 than an associated fastener 718 of the flange 706. Accordingly, in embodiments, one or more torqueing tools may be utilized to make or break connections of the coupling assembly 710.

Figure 8:
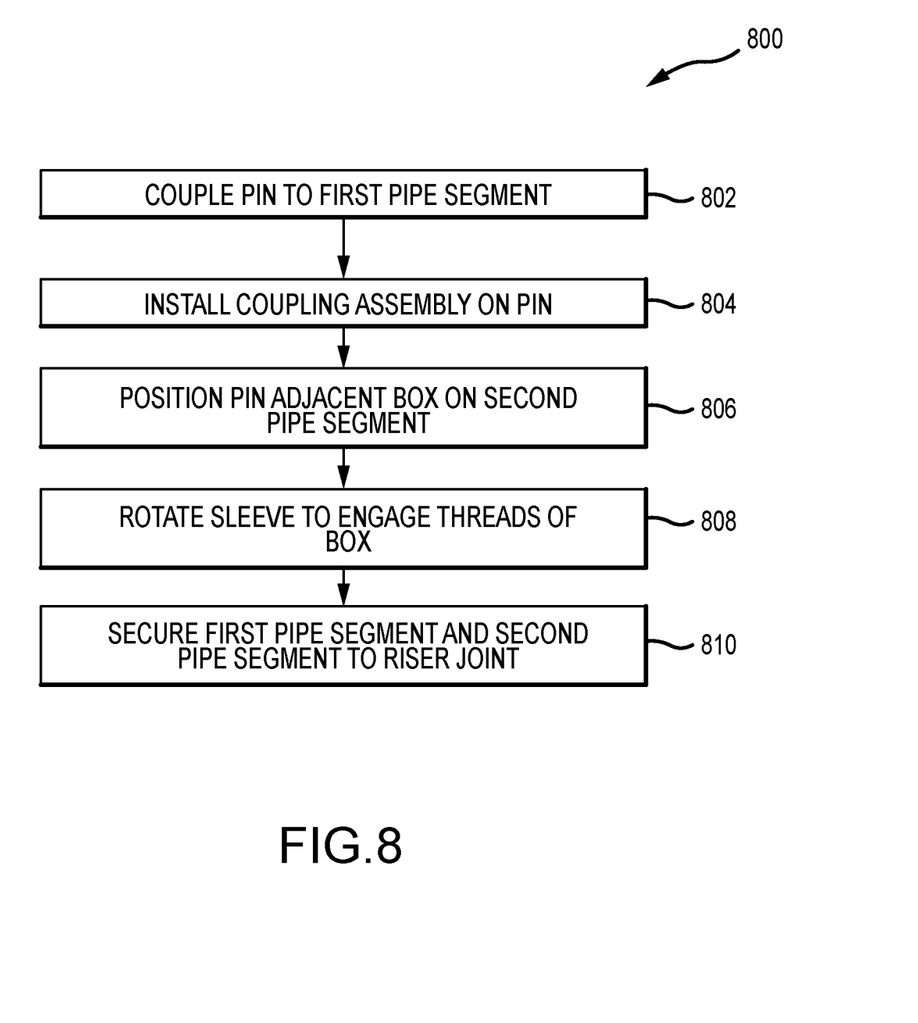
FIG. 8 is a flow chart of an embodiment of a method for installing an auxiliary line via a coupling assembly, in accordance with embodiments of the present disclosure.

FIG. 8 is a flow chart of an embodiment of a method 800 for installing an auxiliary line to a riser segment. It should be appreciated that for this method and other methods described herein that there may be more or fewer steps. Furthermore, the steps may be performed in any order or in parallel, unless otherwise specifically stated. In this example, a pin is coupled to a first pipe segment (block 802), for example to a pipe segment forming at least a portion of an auxiliary line. In various embodiments, the pin may be retrofit by coupling to an existing auxiliary line that is taken out of service. Additionally, in embodiments, the pin may be coupled or otherwise formed directly onto the pipe segment.

The method continues with by installing at least a portion of a coupling assembly to the pin (block 804). In various embodiments, the coupling assembly may include one or more components, such as a split ring and a separately coupled sleeve, for example. The split ring and/or the sleeve may include threads to facilitate coupling to one another, as well as other components of the system. In various embodiments, the split ring is arranged coaxially with the pin and disposed radially outward of the pin. The split ring may include one or more fasteners to couple segments together and/or one or more fasteners to couple directly to pin.

In embodiments, the pin may be arranged adjacent to a box (block 806) that may be coupled to a second pipe segment. For example, the box may include an opening or recess to receive at least a portion of the pin. In certain embodiments, the sleeve may be arranged to receive an outer diameter of the box, which may also include external threads that mate with the threads of the sleeve. The sleeve may be coupled to the box before the sleeve is coupled to mating threads of the split ring. The split ring may be rotated to engage the box threads (block 808). For example, the split ring may rotate about (or with) the split ring to bring the recess of the box toward the pin. In this manner, the auxiliary line may be formed from a series of segments each having a box and pin connector that includes the coupling assembly. It should be appreciated that, in other embodiments, the sleeve may rotate and the split ring may be stationary. Such a configuration may be easier to repair and/or replace while on the platform due to the elimination of various welded connections between the segments of the auxiliary line. Furthermore, as described above, various components may be formed from non-NACE materials and, as a result, may be formed from higher strength materials that facilitate smaller components.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

What is claimed is:

1. A system, comprising:
   a marine riser, having a central axis;
   an auxiliary line disposed radially outward from the marine riser about the central axis,
   wherein the auxiliary line is positioned circumferentially around the marine riser, and
   wherein the auxiliary line comprises a first pipe segment and a second pipe segment;
   a pin end of the first pipe segment, the pin end including a flange;
   a box end of the second pipe segment, the box end having a recess configured to receive the pin end, a face of the box end abutting the flange when the pin end is installed within the recess; and
   a coupling assembly joining the first pipe segment to the second pipe segment, the coupling assembly comprising a split ring arranged axially proximate the flange and a sleeve, wherein threads of the sleeve engage first mating threads on the split ring and second mating threads on the box end to secure the first pipe segment to the second pipe segment, the coupling assembly positioned to transmit a tensile load through at least the sleeve and the flange.

2. The system of claim 1, wherein the box end includes an axial recess that receives a seal, the axial recess arranged proximate the pin end when the pin end is installed in the box end.

3. The system of claim 1, wherein the flange includes a shoulder, the shoulder abutting the split ring opposite the face of the box end to restrict axial movement of the split ring in at least one direction.

4. The system of claim 1, wherein both the split ring and the sleeve are non-threadingly engaged with the pin end.

5. The system of claim 1, wherein a diameter of the flange is larger than a diameter of a proximate pin end section.

6. The system of claim 1, wherein the coupling assembly and the box end are formed from different materials, wherein materials forming the coupling assembly have at least one of a higher hardness or a higher strength than materials forming the box end.

7. The system of claim 1, wherein an outside diameter of the box end and an outside diameter of the flange are substantially equal and the sleeve is arranged radially outward of at least a portion of the box end and the flange.

8. The system of claim 1, wherein the split ring is coupled to the pin end via a fastener.

9. The system of claim 1, wherein the split ring is arranged within a recess formed in the pin end, the recess including a shoulder blocking axial movement of the split ring in at least one direction.

10. A coupling, comprising:
    a split ring adapted to couple to a first tubular segment, the split ring including a threaded portion at a first outer diameter and an end having a second outer diameter, larger than the first outer diameter; and
    a sleeve adapted to couple to a second tubular segment and the split ring, wherein the sleeve includes internal threads configured to couple to mating threads on the second tubular segment and to the threaded portion of the split ring, wherein at least a portion of a tensile load is transmitted, at least in part, through the sleeve, between the first tubular and the second tubular,
    wherein the first tubular segment and the second tubular segment are portions of an auxiliary line of a marine riser, and
    wherein the second outer diameter is substantially equal to a third outer diameter of the sleeve.

11. The coupling assembly of claim 10, wherein the first tubular segment excludes threads from a pin end proximate the sleeve.

12. The coupling assembly of claim 10, wherein the coupling assembly and the second tubular segment are formed from different materials, wherein materials forming the coupling assembly have at least one of a higher hardness or a higher strength than materials forming the second tubular segment.

13. The coupling assembly of claim 10, wherein the split ring includes an aperture, the aperture configured to receive a fastener to couple the split ring to the first tubular segment.

14. The coupling assembly of claim 10, wherein the split ring is axially restricted, in at least one direction, when coupled to the first tubular segment.

15. The coupling assembly of claim 10, wherein the split ring is formed into at least two annular sections, the at least two annular sections coupled together via one or more fasteners.

16. A method for coupling a first pipe segment to a second pipe segment, comprising:
    providing a marine riser extending from a subsea well to a platform,
    providing an auxiliary line arranged radially outward from a central axis of the marine riser,
    wherein the auxiliary line comprises the first pipe segment and the second pipe segment;
    wherein the first pipe segment comprises a pin and a flange, and wherein the second pipe segment comprises a box;
    installing at least a portion of a coupling assembly to the first pipe segment, the coupling assembly arranged proximate the flange to axially restrict movement of at least a portion of the coupling assembly in at least one direction and to transmit a tensile load, at least a portion of the tensile load being received at the flange;
    engaging external threads of the box via internal threads of at least a portion of the coupling assembly,
    wherein engaging external threads of the box via internal threads of at least a portion of the coupling assembly further comprises coupling a sleeve to the second pipe segment, the sleeve including mating threads on an inner diameter; and coupling the box to the pin via rotation of at least a portion of the coupling assembly.

17. The method of claim 16, wherein installing the coupling assembly to the first pipe segment comprises:

installing a split ring proximate the flange, the split ring including threads over at least a portion.

18. The method of claim 17, wherein coupling the box to the pin via rotation of at least a portion of the coupling assembly further comprises:

rotating the split ring.

* * * * *